United States Patent Office 2,815,322
Patented Dec. 3, 1957

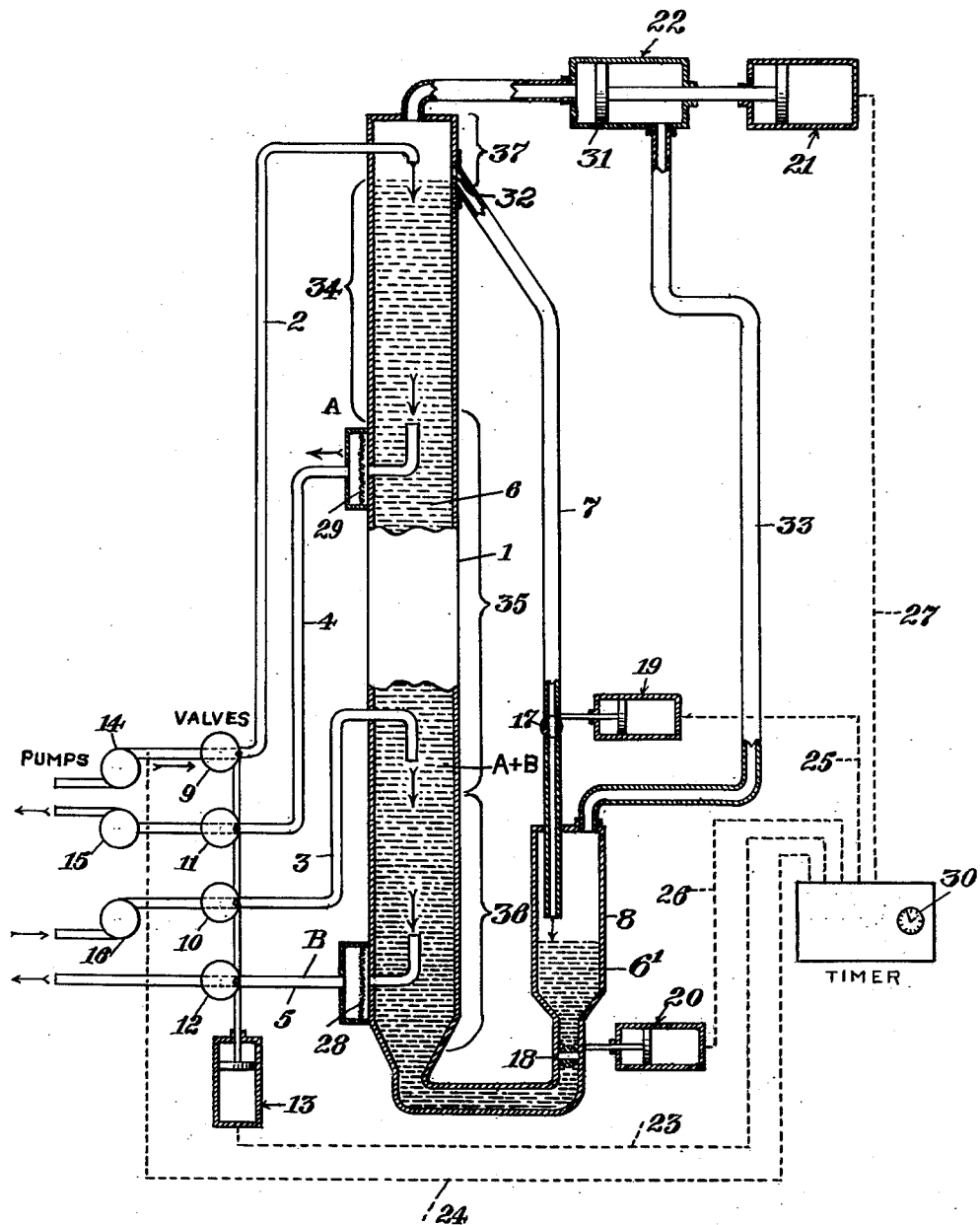

2,815,322

COUNTER-CURRENT LIQUID-SOLID MASS TRANSFER METHOD AND APPARATUS

Irwin R. Higgins, Oak Ridge, Tenn.

Application March 31, 1954, Serial No. 419,994

12 Claims. (Cl. 210—33)

This invention relates to a granular solid and liquid contacting device and a method of obtaining efficient mass transfer between the two phases. In principle this can best be related to the method of ion exchange. Ion exchange devices are known and one well known example is a zeolite water softener. In the zeolite process, hardness-imparting ions are exchanged for sodium ions when the hard water passes through the zeolite bed.

In my process a bed of finely divided particulate material may be used which has the capacity for causing ion exchange. Certain resins, such as styrene polymerized with divinylbenzene and sulphonated, are produced in finely divided form, such as small spheres, and have the properties of thermo setting resins with temperature stability and essentially complete insolubility in most solvents. It has been found that some resins of the type just mentioned can be produced with such characteristics that they can be used to cause ion exchange in various ways. Several such resins have ben developed. This invention is concerned with the use of such materials.

In the past, a fixed bed of plastic particulate exchange material has been used in a cyclic manner, with alternate loading and elution periods. Later, continuously operating exchange devices were used, such as in the patent to Fitch, No. 2,572,848, issued October 30, 1951. These prior devices have disadvantages. The first is slow and requires two beds operating on a staggered cycle to keep production at a high level. In the second method throughput per unit of cross sectional area is lower per device than with the fixed bed.

The device of this invention overcomes some of the disadvantages of both former systems. In this device the bed of solid exchange particles of the type mentioned above is operated substantially as a fixed bed, but is moved vertically, periodically, to transfer a portion of the particulate material to an elution position. This transfer takes place after the plastic has reached a predetermined condition or saturation which empirically is reduced to a period of time.

It is, therefore, an object of this invention to provide a solid and liquid contact exchange device having a mass of particulate material in the form of a bed in a column, and which bed can be moved, periodically, to pass some of the material in a loop circuit from the top to the bottom of the column.

Another object is to circulate both solid and liquid at any desired flow rate with free flow, and in opposite directions.

Another object is to pass some of the particulate material from another segment of the loop circuit into the main column.

Another object is to circulate the particulate material without any substantial change in the relative positions of the particles throughout the mass in the column.

A further object is to operate a solid and liquid contact exchange device substantially as a fixed bed type by relatively long periods of operation and relatively short periods of shut-down for transfer of material, so that nearly continuous operation is attained.

Other objects may appear as this specification proceeds, when considered in connection with the drawing forming a part hereof.

In the drawings:

The single figure represents diagramatically a device for carrying out the method to be outlined herein.

In the figure, 1 represents a tower of suitable construction and size. Tower 1 is provided with inlet or feed pipes 2 and 3 and outlet pipes 4 and 5, however with no restrictions as to the number of inlet and outlet pipes that may be required. Inside the tower 1 is a bed 6 of material which consists preferably of an ion exchange resin in particulate form, such as that mentioned above. 7 represents an overflow pipe leading to a receptacle 8 wherein there is a portion 6' of the material of the bed 6.

Valves 9 and 10 in pipes 2 and 3 stop liquid flow during the time that the particulate solids are moving. Other valves 11 and 12, in pipes 4 and 5, allow the passage of fluids from the tower, and stop such flow during circulation of the solids. Valves 9, 10, 11 and 12 are operated by means of a suitable motor 13 represented here as an hydraulic motor. A series of positive displacement pumps 14, 15, and 16 move the fluids in pipes 2, 4 and 3, respectively, at a predetermined rate. The effluent flows in pipe 5 by pressure created by pumps 14 and 16. These pumps are the metering devices for regulating the flow of fluids in the circuit, and are so governed as to give the desired flow.

Valves 17 and 18 are placed at opposite ends of receptacle 8. Valve 17 is operated by a suitable motor 19, shown here as an hydraulic motor, and valve 18 is operated by a motor 20, represented as an hydraulic motor. A suitable motor 21, represented here as an hydraulic motor, operates a pump 22 for purposes which will later appear.

A timer, labeled as such and diagrammatically represented here, is connected to valve motor 13 by a line represented by the dash line 23 and to the pumps 14, 15 and 16 by a line represented by the dash line 24. A connection from the timer to the motor 19 is represented by the dash line 25 and another to motor 20 is represented by dash line 26. Also a connection represented by dash line 27 leads from the timer to motor 21.

Valves 9, 10, 11, and 12; pumps 14, 15, and 16; motors 13, 19, 20, and 21, and the timer being, per se, no part of my present invention, they are all shown diagrammatically, and it has not been deemed necessary to show supply and exhaust lines nor valve control means for motors 13, 19, 20 or 21. Nor is it deemed necessary to show driving means for pumps 14, 15 and 16, as such may be conventional. The timer may be of conventional construction operating either electrically or mechanically through lines 23, 24, 25, 26, and 27 to control the respective devices with which it is associated.

The cycle of operations will now be described wherein the device is used as an ion exchanger for separating two ionized materials A and B from a mixture thereof. These products are separated due to the fact that each has a different affinity for the particulate solid adsorber in bed 6. One material may be objectionable and the other desirable, or both may be desirable. The device, therefore, may be used for separation or purification, by providing suitable resin and reactants.

In one stage of the cycle of operations, valve 17 is open and valve 18 is closed. Valves 9, 10, 11, and 12 are open. The mixture of materials A and B to be separated is pumped in through pipe 3 and encounters the column 6 of exchange material in tower 1 and a stripping solution is pumped in through pipe 2. On contact with the material in bed 6 and the stripping solution, materials A and B separate, since material A has a different affinity for the ion exchange material than that of material B.

In this case, because of the periodic movement, hereinbefore described, of the bed of particulate material in tower 1 the absorbed material A is thereby moved upward and, due to the action of the stripping solution, out through pipe 4. The particulate material is retained by screen 29. Material B moves downwardly and enters pipe 5 through screen 28.

After a suitable period of time, as determined by the setting of the clock 30 on the timer, valves 9, 10, 11 and 12 are closed, pumps 14, 15 and 16 are stopped, valve 17 is closed, and valve 18 is opened. Motor 21 operates pump 22, moving piston 31 to the right, as viewed in the drawing. The vacuum thus created at the left of piston 31 causes the material in bed 6 to be lifted into section 37 as a unit in the manner of a piston in a cylinder. As soon as the valve 18 is closed and valve 17 is opened the portion of the material in section 37 overflows at 32 through pipe 7. Pressure to the right of piston 31 transmitted through pipe 33 assists in the movement of the mass of material.

I have taken the separation of materials A and B as examples of an ion exchange with which this device is used. In discussing the functioning of the device, the tower 1 is divided roughly into four zones 34, 35, 36 and 37. While there may be no sharp line of demarcation between the zones, the limits as shown serve to illustrate the operation of the device.

A and B represent materials in solution, each of which has a different affinity for the solid particle exchange resin or solid. If the resin were stationary and a strip solution were fed into zone 37 by pump 14, both A and B would flow downwardly toward outlet valve 12, but at different rates. The average rates of solution moving down and resin moving up are so adjusted that A flows into zone 35 and B moves into zone 36. The solution moving down through zone 34 is moving faster than it is in zone 35, as part of it is being withdrawn at valve 11 through pipe 4. In zone 35, the solution moves slower, allowing A to move up, but fast enough so that none of B can flow up and this product is, therefore, drawn off through pipe 5. Since A cannot go down farther, it must exit through pipe 4.

The action in zone 34 is called stripping. The action in zone 35 is called "extraction of B from A by the solution." The action in zone 36 is called "extraction of A from B by the solid."

In a test of this method, a laboratory set-up was used with a 1-inch by 7-foot tube as a tower. A solution of sodium hydroxide and lithium hydroxide was passed into the column of resins in the tube. Approximately the top 3 feet were used as a total-reflux lithium enricher, with a 2.4 mol NaOH-0.024 mol LiOH solution flowing countercurrent to the hydrogen-form of a 50–100 mesh cation exchange resin which is a sulfonated copolymer of styrene, ethylvinylbenzene and divinylbenzene. The bottom 2 feet were used to reconvert the resin to H-form with a stripping solution comprising about 6 mol $HNO_3$, flowing counter to the Li-Na resin, which is cycled from the top of the column.

The run was started by eluting the H-resin as a fixed bed to convert the top, approximately 39 inches, to the Li-Na form and then moving the resin at the average rate necessary to hold the alkali-acid exchange zone at the 39 inch point. This was quite easy to accomplish since a pH indicator in the solution caused a color change at the exchange zone and the presence of hydroxyl ions in the solution caused the exchange zone to extend but a few inches along the column. The resin was converted from H+ form to Li-Na form, and the solution from 2.4 mol $OH^-$ to essentially pure water. The remaining portion of the 2 foot column was used as a safety factor to prevent any significant loss of Li or Na and to wash the $HNO_3$ out of the incoming resin. The feed solution flow rate used was about 3.6 ml. per min. per cm.$^2$. The average linear rate of movement of the resin was about 3.6 cm. per min. At the end of each 8-hour shift, the solution in the column was sampled at 15, 27 and 39 inches below the feed point, by inserting a hypodermic needle through "Neoprene" gaskets, and analyzed for Li and Na. Samples taken at the bottom of the reflux section and at the top of the regeneration section were Li and Na free.

The above tests showed efficient removal of Na from Li.

The rate of fluid flow is not restricted, and there is no danger that the bed of solid exchange material will fluidize; and the whole column moves much as a solid body lubricated by the fluid contained therein.

While the motors above referred to are herein shown as hydraulic devices, for the purpose of illustration, they may be pneumatic or fluid motors; and electric or other motors may be substituted.

While a specific sample of ion exchange operation has been given, it is in no way to be taken as a limitation of this process, as I desire to include all modifications and variations within the scope of the appended claims.

Having thus described my invention, what I claim is:

1. In an exchange apparatus, a tower for supporting a column of exchange resin, an inlet intermediate the ends thereof for a mixture of materials, an inlet at the upper end thereof for a stripping solution, an outlet above the first inlet and an outlet below said inlet, a connection from the upper end of the tower to the lower end, forming a loop, valves in said connection, valves in said inlets and outlets, motors to operate said valves, pumps in said inlets and said first outlet, a pump connected to the upper end of said tower and to said loop, at a point between a pair of valves in said loop for circulating the resin, a motor for said pump, a timer for said motors and said first-mentioned pumps whereby all of the valves are operated to shut off the flow of fluids and permit movement of said column of resin by said last-mentioned pump.

2. In a separation apparatus, a tower for supporting a column of exchange material, an inlet for a mixture of fluids, an inlet for a stripping fluid, outlets for separated fluid, a loop connection with the upper and lower ends of the tower, flow means for the fluids, valve means controlling the fluid inlets and outlets, resin-flow valves in said loop circuit, circulating means for said resin, timing means connected to all said valve means and circulating means whereby the fluid flow is shut off and the resin moved upwardly, a portion of the resin being returned to the bottom of the column through said loop.

3. The apparatus of claim 1 in which the motors for operating the valves and the resin pump are hydraulic motors.

4. The apparatus of claim 2 in which the connections between the timer and the valve means and between the timer and the resin circulating means include motors.

5. The apparatus of claim 4 in which the motors are hydraulic motors.

6. The apparatus of claim 2 in which the circulating means for the resin is a pump connected so as to exert suction on the upper end of the resin column and pressure on the lower end to move the column vertically.

7. In a method wherein a fluid starting mixture to be treated is fed from an outside source as a stream to a column in a treating system, which column contains a compact bed of solid particulate material having a property of absorbing at least one ingredient of the fluid starting mixture in preference to another ingredient of said mixture and which column constitutes a portion of a loop through which the solid particulate material is circulated, wherein the stream is passed through one segment of the loop in the column containing at least a portion of the bed and substantially withdrawn from the loop at a point in said one segment, and a stripping fluid is fed from an outside source to and through a second segment of the loop containing a portion of the solid particulate material for stripping such material and is substantially withdrawn from the loop at a point in the second segment thereof, passing said fluids to and through said respective segments of the loop while the bed of solid particulate material in said column is substantially stationary, characterized by the improvements of periodically concurrently interrupting the feeds to and withdrawals from the loop of said fluids, during each of the interruptions adding to one end of the column adjacent to the point from which the treated starting fluid is withdrawn an amount of the solid particulate material from a third segment of the loop under an applied pressure while subjecting the other end of the column to a lower pressure whereby the solid particulate material within the column is caused to move as a fairly compact bed linearly of the column in a direction away from adjacent to where the treated starting fluid is withdrawn, stopping such linear movement of the bed of particulate material, removing a portion of the particulate material from the end portion of the column previously subjected to the lower pressure, passing particulate material treated by the stripping fluid into the third segment of the loop, and thereafter resuming the cycle beginning with feeding the fluid starting mixture and stripping fluid to and passing them through the said respective first and second segments of the loop.

8. In a method as described in claim 7, the further improvement of accomplishing the movement of the solid particulate material into and from the column and of linear movement therethrough as a fairly compact bed therein under a pressure difference at opposite ends thereof comprising temporarily closing a part of the loop at a point therein connecting the two ends of the column and with said third loop segment containing a portion of the solid particulate material in a part thereof between the point at which the loop is closed and the end of the column from which the treated starting fluid is withdrawn, applying a fluid pressure to this last-mentioned portion of the solid particulate material tending to press it into the latter end of the column while subjecting the other end of the column to a lower pressure whereby the solid particulate material is further aided in its movement into the column and the bed of solid particulate material is caused to move linearly within the column as a fairly compact bed, and reopening the previously closed point of the loop thereby providing for discharge of a portion of the solid particulate material from the end of the column which was subjected to the lower pressure into said third segment of the loop.

9. In a method as described in claim 7, the improvement of accomplishing the linear movement of the solid particulate material as a fairly compact bed in the column, wherein the particulate material added to one end of the column is under an applied pressure thereto while the other end of the column is subjected to suction.

10. In a method as described in claim 7, the improvement of accomplishing the linear movement of the solid particulate material in the column wherein the addition of the particulate material to one end of the column is by the application of air pressure thereon for pressing it into one end of the column while subjecting the other end of the column to a lower pressure.

11. In a method as described in claim 7, the improvement of moving the solid particulate material as a fairly compact bed linearly upwardly through the column under a pressure differential between the top and bottom of the column, the lower pressure being at the top of the column.

12. In a method as described in claim 7, the improvement of passing the stream of starting fluid to be treated and of the stripping fluid downwardly through the column during feedings and withdrawals thereof to and from the column, and moving the solid particulate material linearly upwardly through the column during the interruptions of the feedings and withdrawals of said fluids.

References Cited in the file of this patent

UNITED STATES PATENTS

| | | |
|---|---|---|
| 1,887,774 | Menizer | Nov. 15, 1932 |
| 1,903,612 | Dotterweich | Apr. 11, 1933 |
| 2,003,757 | Pick | June 4, 1935 |
| 2,188,919 | Profitt | Feb. 6, 1940 |
| 2,323,830 | McMillan | July 6, 1943 |
| 2,528,099 | Wilcox et al. | Oct. 31, 1950 |
| 2,564,717 | Olsen | Aug. 21, 1951 |
| 2,572,848 | Fitch | Oct. 30, 1951 |
| 2,585,490 | Olsen | Feb. 12, 1952 |
| 2,594,175 | Judd | Apr. 22, 1952 |
| 2,709,643 | Peery | May 31, 1955 |
| 2,742,381 | Weiss et al. | Apr. 27, 1956 |